United States Patent
Tsengas (10) Patent No.: US 8,220,418 B1
(45) Date of Patent: Jul. 17, 2012

(54) FETCH AND RETRIEVE TOSSING TOY

(75) Inventor: Steven Tsengas, Fairport Harbor, OH (US)

(73) Assignee: OurPet's Company, Fairport Harbor, OH (US)

( * ) Notice: Subject to any disclaimer, the term of this patent is extended or adjusted under 35 U.S.C. 154(b) by 0 days.

(21) Appl. No.: 13/084,874

(22) Filed: Apr. 12, 2011

Related U.S. Application Data (63) Continuation of application No. 11/945,716, filed on Nov. 27, 2007, now Pat. No. 7,878,151, and a continuation of application No. 12/792,918, filed on Jun. 3, 2010, now abandoned.

(51) Int. Cl.
A01K 29/00 (2006.01)

(52) U.S. Cl. .......................... 119/707; 446/34

(58) Field of Classification Search ............. 119/707, 119/702, 709, 710, 711; D30/160; 446/34, 446/236, 255; 43/3
See application file for complete search history.

(56) References Cited

U.S. PATENT DOCUMENTS

| | | | | |
|---|---|---|---|---|
| 2,131,229 A | * | 9/1938 | McMennamin | 446/419 |
| 3,577,670 A | * | 5/1971 | Gutierrez | 446/330 |
| 3,830,202 A | * | 8/1974 | Garrison | 119/709 |
| 4,228,977 A | * | 10/1980 | Tanaka | 244/153 R |
| 4,321,888 A | * | 3/1982 | Topliffe | 119/709 |
| 4,907,537 A | * | 3/1990 | Shirk | 119/707 |
| 5,176,559 A | * | 1/1993 | Lane | 446/35 |
| 5,191,856 A | * | 3/1993 | Gordon | 119/711 |
| D346,048 S | * | 4/1994 | Jandebeur et al. | D30/160 |
| 5,531,666 A | * | 7/1996 | Hung | 601/129 |
| 5,560,320 A | * | 10/1996 | Plunk | 119/709 |
| 5,706,762 A | * | 1/1998 | Dokken | 119/712 |
| 5,782,207 A | * | 7/1998 | Goodham | 119/707 |
| 5,865,146 A | * | 2/1999 | Markham | 119/707 |
| 6,415,740 B1 | * | 7/2002 | Curry | 119/707 |
| 6,490,998 B1 | * | 12/2002 | Rocher | 119/707 |
| 6,574,904 B1 | * | 6/2003 | Fencel et al. | 43/3 |
| 6,615,766 B1 | * | 9/2003 | Curry | 119/207 |
| 6,681,721 B1 | * | 1/2004 | Buschy | 119/709 |
| D500,901 S | * | 1/2005 | Crane | D30/160 |
| D500,902 S | * | 1/2005 | Crane et al. | D30/160 |
| D513,816 S | * | 1/2006 | Crane et al. | D30/160 |
| D517,752 S | * | 3/2006 | Byrne | D30/160 |
| 7,201,117 B2 | * | 4/2007 | Ritchey et al. | 119/709 |
| D542,506 S | * | 5/2007 | Springer | D1/106 |
| D546,507 S | * | 7/2007 | Byrne | D30/160 |
| D571,061 S | * | 6/2008 | Nazimek | D30/160 |
| 7,455,033 B2 | * | 11/2008 | Curry | 119/709 |
| 7,513,220 B2 | * | 4/2009 | Ragonetti et al. | 119/707 |
| 7,543,550 B2 | * | 6/2009 | Simpson | 119/708 |
| D635,309 S | * | 3/2011 | Axelrod et al. | D30/160 |
| D637,773 S | * | 5/2011 | Tsengas | D30/160 |
| 2006/0162672 A1 | * | 7/2006 | Dokken | 119/707 |
| 2006/0260560 A1 | * | 11/2006 | Renforth et al. | 119/707 |
| 2007/0234969 A1 | * | 10/2007 | Lynch | 119/707 |
| 2009/0000565 A1 | * | 1/2009 | Bryce | 119/707 |
| 2009/0071412 A1 | * | 3/2009 | Ritchey | 119/709 |
| 2009/0101078 A1 | * | 4/2009 | Dobihal | 119/707 |

* cited by examiner

Primary Examiner — Yvonne Abbott
(74) Attorney, Agent, or Firm — John D. Gugliotta, Esq.

(57) ABSTRACT

A pet toy is provided having a tubular, linearly elongated main body terminated at each end by a replaceable wing assembly. As the toy is flying through the air, the wings provides a visual 'flapping' like stimuli, similar to that of the wings of a bird. The instant abstract is neither intended to define the invention disclosed in this specification nor intended to limit the scope of the invention in any way.

17 Claims, 7 Drawing Sheets

FETCH AND RETRIEVE TOSSING TOY

RELATED APPLICATIONS

The present invention is a Continuation of U.S. application Ser. No. 11/945,716 now U.S. Pat. No. 7,878,151 filed on Nov. 27, 2007 and issued on Feb. 1, 2011), and U.S. Ser. No. 12/792,918 filed on Jun. 3, 2010 now abandoned, incorporated by reference as if rewritten fully herein.

BACKGROUND OF THE INVENTION

1. Field of the Invention

The present invention is directed generally to pet toys, and particularly to a pet toy designed to appeal to an animal's instinctive behaviors and facilitate activities based on such instincts.

2. Description of the Related Art

Dogs enjoy retrieving various types of objects such as sticks, balls, flying discs, and the like. Many breeds have an enhanced enjoyment in "playing fetch" in that such activities have been bred into such lines. Retrievers, bird dogs or gun dogs have been bred to retrieve game foul, spaniels to flush birds from the brush, and other such similar activities. Typically, such breads can be entertained by retrieving a flying disc is made from a plastic material. The disc has an outer side with a generally smooth surface and an underside that has a rim extending along the periphery of the disc. The rim is raised from the rest of the disc so that the dog may easily grip the rim between its jaws.

A problem may occur, however, when the dog seeks to retrieve the disc in that the disc may not always be easily gripped by the dog. That is, if the disc lands with the underside facing upwardly, the rim is exposed which the dog may grip with its teeth. If the disc lands with the underside facing downwardly, the dog may have some difficulty in grasping the smooth side of the disc with its teeth.

Therefore, the dog may not be able to retrieve the disc, thereby decreasing the enjoyment of the game by both the person throwing the disc as well as the dog.

Another problem may occur in that even though such breeds have the instinct to retrieve, a plastic disc shaped object just simply will not stimulate this instinct. It has been found that interactive toys are more successfully interactive if they have been designed with a fundamental understanding of the animal's biological behavior, instincts, unique senses and physical capabilities and needs. In order to accomplish this, the interactive toy must stimulate and reward positive mental and physical activity through real sounds, sights, tactile feel, aroma, movement, and the like.

Therefore, a need exists for a durable dog fetch and retrieve toy that is capable of providing the stimulus that triggers the animal's instinctive retrieving behaviors.

SUMMARY OF THE INVENTION

It is an object of the present invention to provide a fetch and retrieve pet toy designed to appeal to an animal's instinctive behaviors and facilitate activities based on such instincts.

It is a feature of the present invention to provide a elongated fetch toy having flappable appendages connected to either side.

Briefly described according to the preferred embodiment of the present invention, a fetch and retrieve pet toy is provided having a linearly elongated cylindrical hollow body formed of rotational molded plastic, or alternately formed of closed cell foam. The cylinder has an outer body surface, and forms an internal tubular conduit along the elongated centerline. At either opposed end are connected a replaceable appendage having in a plurality of individual fingered flexible cloth protuberances. Each of these 'flappable' appendages are connected together by an elastic cord traversing the internal tubular conduit.

According to the preferred embodiment, the present invention provides a pet toy capable of easily being tossed by the owner, easily caught or captured by the pet, and provides a visual stimuli similar to that of an injured or downed winged prey. Such stimulation triggers the naturally bred fetching instincts of some dog breeds.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
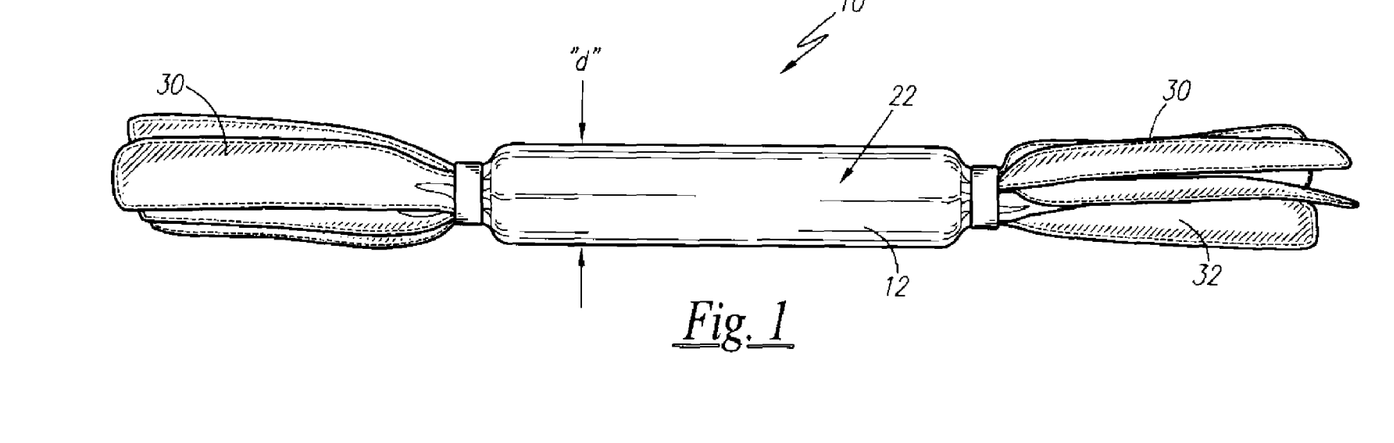
FIG. 1. is a perspective view of fetch and retrieve tossing toy according to the preferred embodiment of the present invention.
Figure 2:
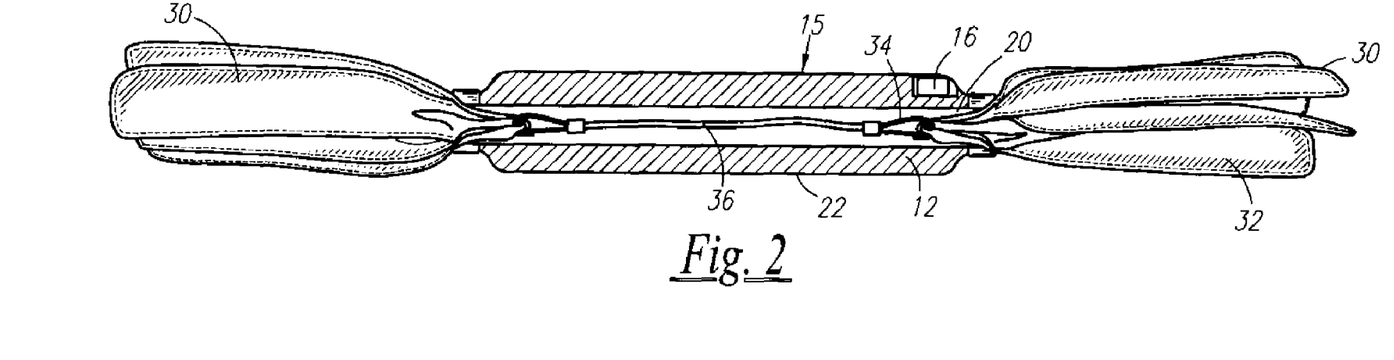
FIG. 2. is a cross sectional view taken along the linear centerline thereof.
Figure 3:
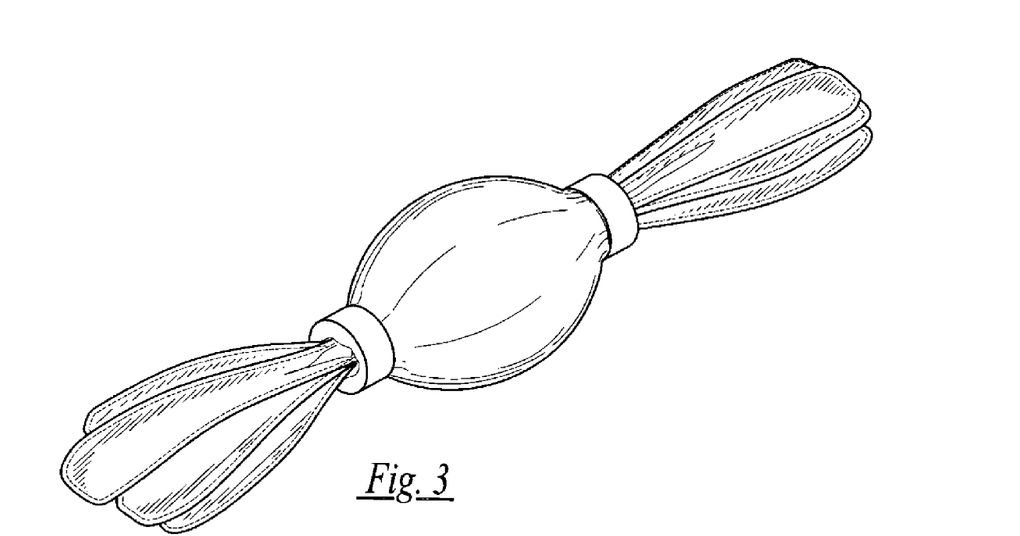
FIG. 3 is a perspective view of a fetch and retrieve tossing toy having an oval main body according to a first alternate embodiment.
Figure 4:
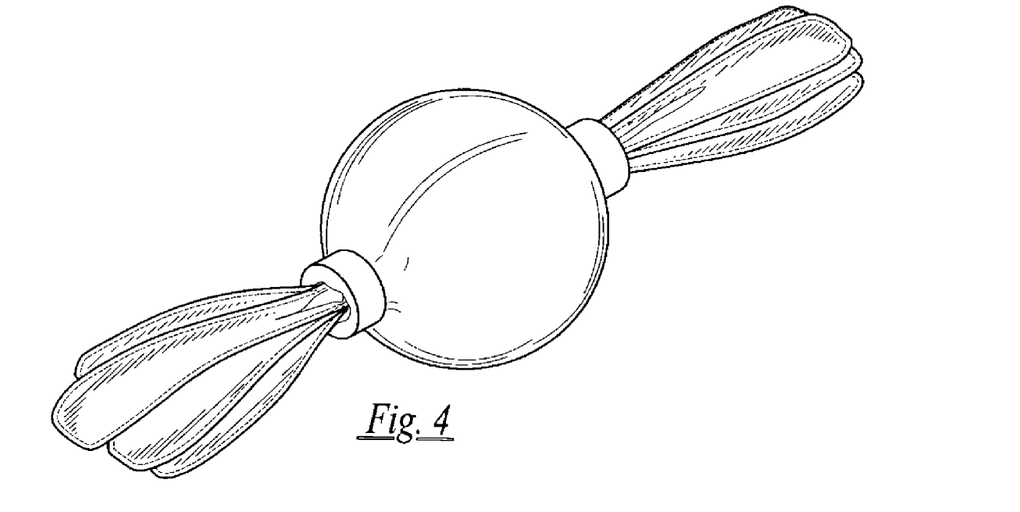
FIG. 4 is a perspective view of a fetch and retrieve tossing toy having a ball-shaped main body according to a second alternate embodiment.
Figure 5:
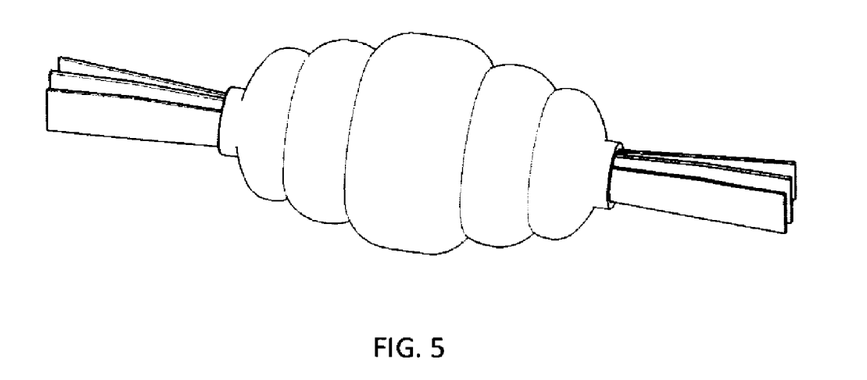
FIG. 5 is a perspective view of a fetch and retrieve tossing toy having a calabash-shaped main body with concentric rings according to a third alternate embodiment.
Figure 6:
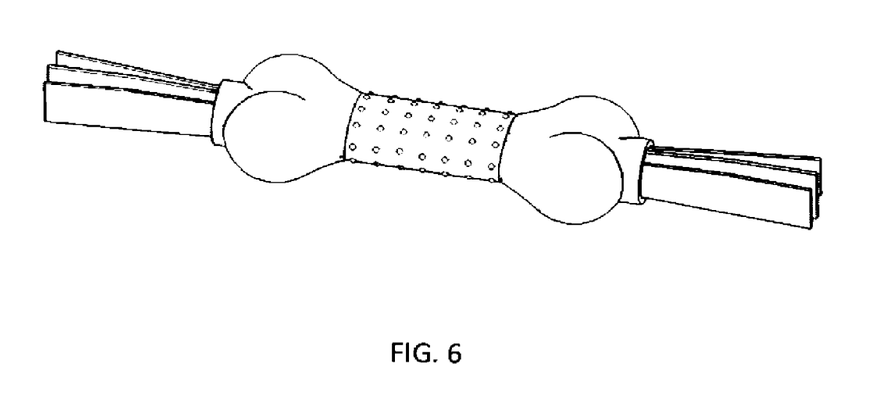
FIG. 6 is a perspective view of a fetch and retrieve tossing toy having a dog-bone shaped main body according to a fourth alternate embodiment.
Figure 7:
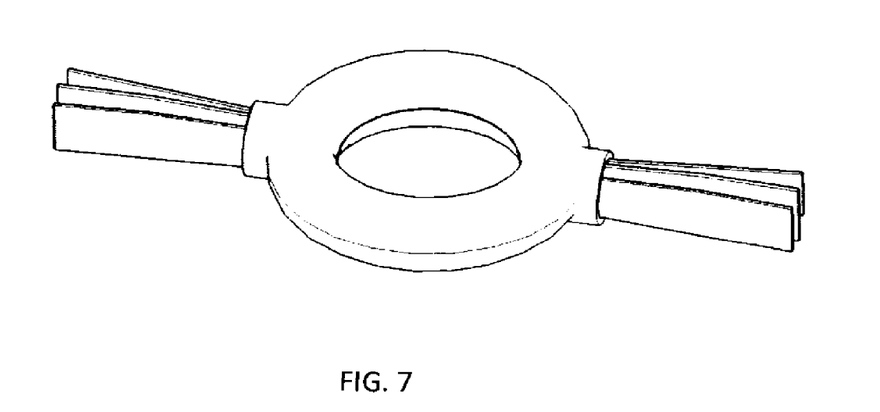
FIG. 7 is a is a perspective view of a fetch and retrieve tossing toy having a annular disc shaped main body according to a fifth alternate embodiment.
Figure 8:
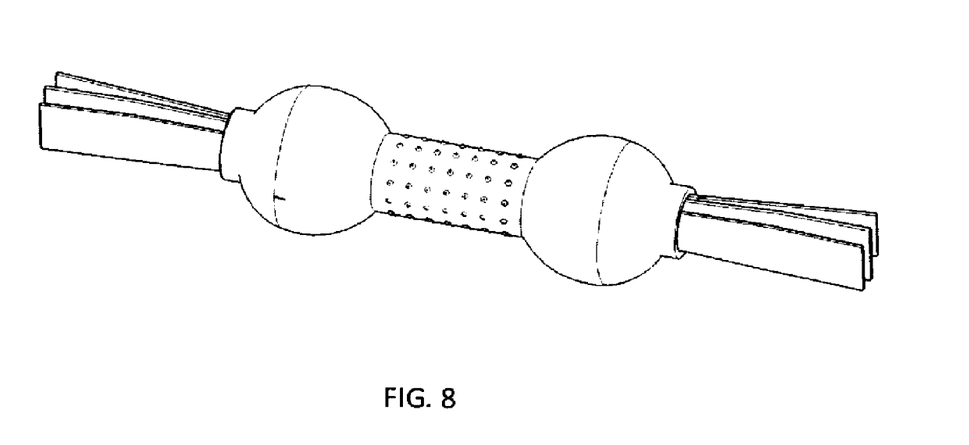
FIG. 8 is a perspective view of a fetch and retrieve tossing toy having a dumbbell shaped main body according to a sixth alternate embodiment.
Figure 9:
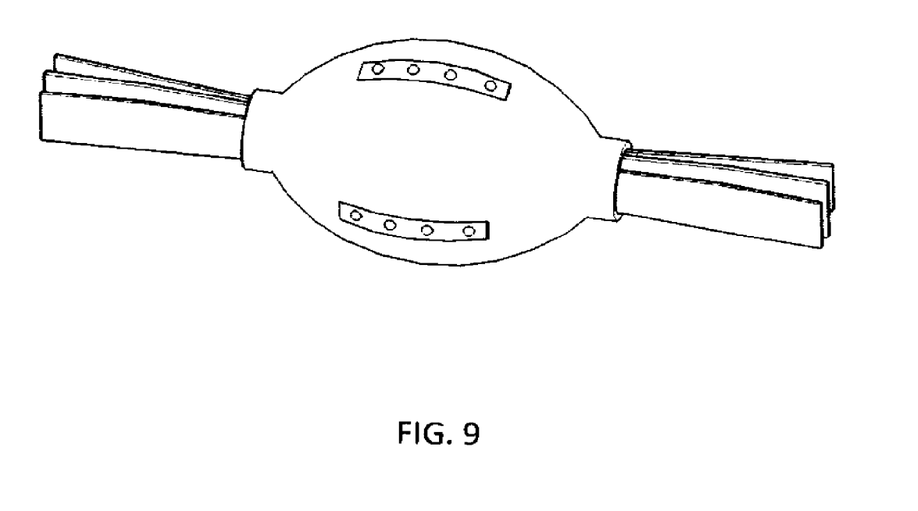
FIG. 9 is a perspective view of a fetch and retrieve tossing toy having a football-shaped main body according to a seventh alternate embodiment.
Figure 10:
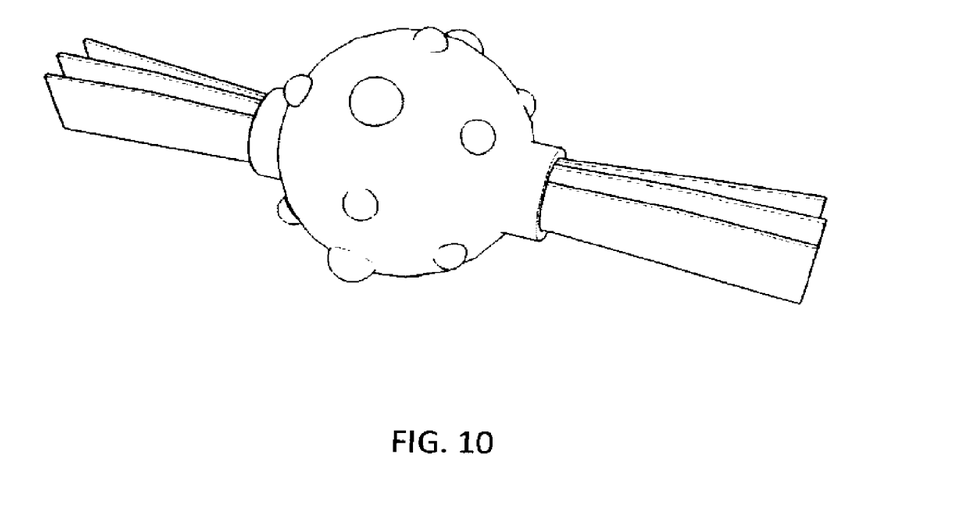
FIG. 10 is a perspective view of a fetch and retrieve tossing toy having a ball shaped main body with bulbous protrusions according to a eighth alternate embodiment.
Figure 11:
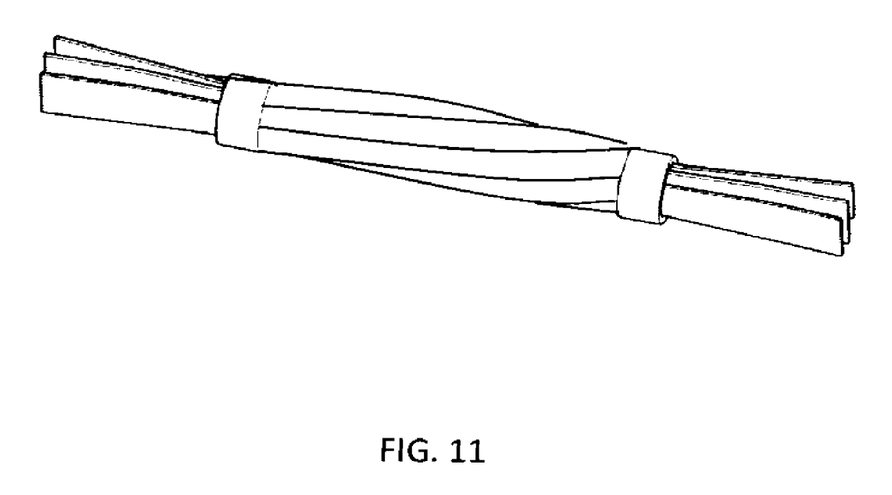
FIG. 11 is a is a perspective view of a fetch and retrieve tossing toy having a braided main body according to a ninth alternate embodiment.
Figure 12:
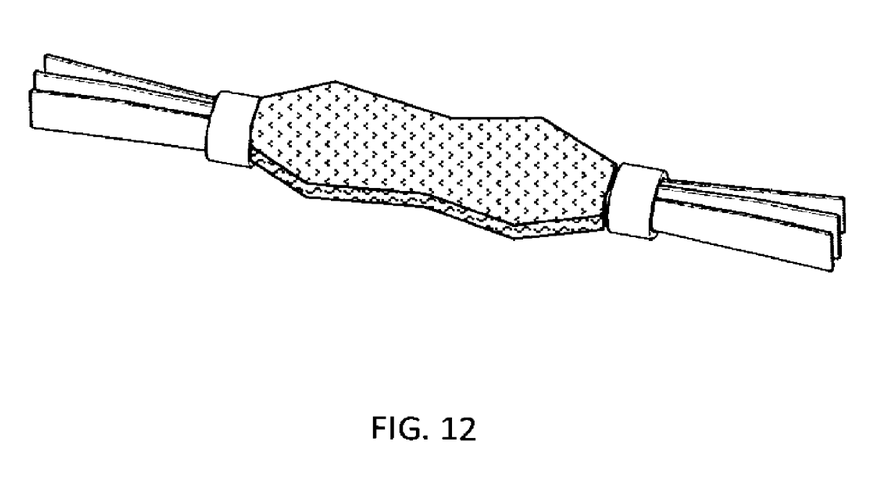
FIG. 12 is a perspective view of a fetch and retrieve tossing toy having an unstuffed flat shaped main body according to a tenth alternate embodiment.
Figure 13:
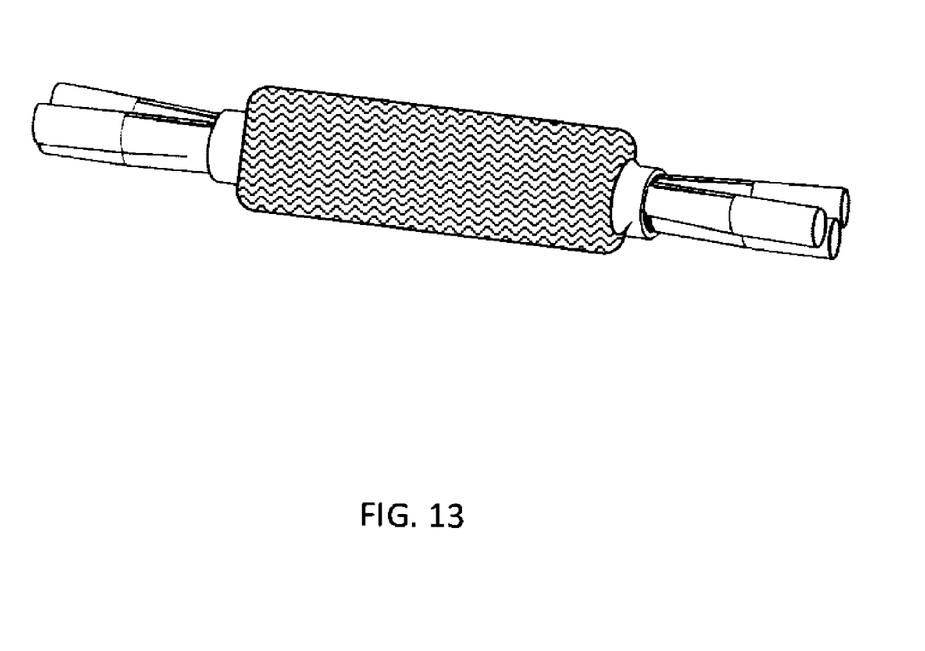
FIG. 13 is a perspective view of a fetch and retrieve tossing toy having a soft flexible tubular shaped main body according to an eleventh alternate embodiment.

Briefly described according to the preferred embodiment of the present invention, a fetch and retrieve pet toy, generally noted as 10, is provided having a linearly elongated, rotationally molded body 12. Such as construction forms a durable biting surface, while at the same time being capable of flotation if placed in water. The body 12 forms a cylindrical formed and having an outer diameter "d" sufficiently small to allow for grasping and carrying in a dog's mouth. In the commercial embodiment, small, medium and large diameters of 1.25 inches, 1.63 inches, and 2 inches, respectively, are provided. However, such dimensions are merely exemplary and are in no way intended to be limiting. Similarly, the body 12 of the commercial embodiment have varying lengths of small, medium and large being of 4 inches, 8 inches, and 9 inches, respectively.

The use of rotational molded plastic for the body 12 forms a hollow double wall that can provide flexibility and give, and can accommodate the incorporation of a noise maker, or 'squeaker' 16, in an otherwise conventional manner. Being hollow, sufficient buoyancy is achieved to act as a flotation device in water. Alternately, the body 12 could be formed of closed cell foam to provide similar performance and cost, but without the capacity to incorporate a squeaker. The body 12 has an outer cylindrical surface 15, and forms an internal tubular conduit 20 along the elongated centerline. The outer surface 15 is covered by a durable outer cover 22, such as a cloth, canvass or ballistic nylon. Such a covering provides a texture, look and feel closer to that of a natural bird prey that cannot be matched by plastic alone, thereby providing further stimulation or reinforcement of natural instincts from successive handling of the toy 10.

At either opposed end are connected a replaceable wing appendages 30. Each wing 30 of the commercial embodiment is anticipated has having varying lengths of small, medium and large being of 3.5 inches, 6 inches, and 8 inches, respectively. Each wing 30 is constructed using two halves of different colors on each side, respectively, further emulating the color contrast typically found naturally on the wings of many birds. Each wing 30 has a plurality of individual fingered flexible cloth protuberances 32. Each of these wings 30 are freely flexible and moveable, creating a 'flapping' motion when thrown. Each wing 30 is connected to a fastener 34. The fastener 34 terminates either end of an elongated elastic member 36, shown herein as a nylon strap or bungee. The wings 30 are such connected together by the elastic cord 36 which traverses the internal tubular conduit 20.

As shown and described, the above enablement of the preferred embodiment is intended to be illustrative of the key features of the present invention in a way as to communicate to a person having ordinary skill in the relevant art those improvements intended; however, they are not intended to be exhaustive nor to limit the invention to the precise forms disclosed and, obviously, many modifications and variations are possible in light of the above teaching. By way of example, and not as a limitation, FIGS. 5-13 show some of such alternate embodiments in which depict various permutations and equivalents.

2. Operation of the Preferred Embodiment

In operation, the present invention is utilized like a convention fetch and retrieve toy, being tossed for purpose of being chased, caught and returned by the user's pet. The elongated, tubular nature of the body 12 provides a pet toy capable of easily being tossed by the owner and easily caught or captured by the pet. As the toy 10 is flying through the air, he wings 30 provides a visual 'flapping' like stimuli, similar to that of the wings of a bird. The bicolor construction further reinforces this stimulation which triggers the naturally bred fetching instincts of some dog breeds. Should the wings 30 become worn or damaged, the user can remove the wing 30 at the fastener 34 and replaced with a suitable replacement component of similar or like construction.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A fetch and retrieve pet toy comprising:
   a linearly elongated, rotationally molded body forming an outer surface having a first end opposite a second end about a centerline;
   a durable outer cover covering said outer surface;
   a first flexible wing, said first flexible wing connected to said first end; and
   a second flexible wing, said second flexible wing connected to said second end; wherein each wing has a plurality of individual fingered flexible protuberances that are freely flexible and moveable, creating a 'flapping' motion when thrown.

2. The pet toy of claim 1, wherein said body forms an outer surface having an outer diameter sufficiently small to allow for grasping and carrying in a dog's mouth.

3. The pet toy of claim 2, wherein said outer diameter is between 1.25 inches and 2 inches.

4. The pet toy of claim 2, wherein said body has a length of between approximately 4 inches and approximately 9 inches.

5. The pet toy of claim 1, wherein said body is formed of hollow molded plastic or rubber and forming a hollow double wall.

6. The pet toy of claim 1, further comprising a noise maker, or 'squeaker' incorporated into said body.

7. The pet toy of claim 1, wherein said outer covering is selected from the group comprising cloth, canvass and ballistic nylon.

8. The pet toy of claim 1, wherein said covering provides a texture, look and feel closer to that of a natural bird prey that cannot be matched by plastic alone, thereby providing further stimulation or reinforcement of natural instincts from successive handling of the toy.

9. The pet toy of claim 1, wherein each said first wing and said second wing are each formed of a first half having a first color attached to a second half having a second color.

10. A method of playing fetch with a pet comprising the steps:
   a. Providing a linearly elongated, rotationally molded tubular body toy having wings at each end;
   b. Tossing said toy such that each said wing provides a visual 'flapping' like stimuli, similar to that of the wings of a bird.

11. The method of claim 10, wherein said wings are of at least two separate colors.

12. The method of claim 10, wherein said wings are replaceable with a suitable replacement component of similar or like construction.

13. The method of claim 10, wherein each said first wing and said second wing are each formed of a first half having a first color attached to a second half having a second color.

14. A fetch and retrieve pet toy comprising:

a linearly elongated, rotationally molded body forming an outer surface having an outer diameter sufficiently small to allow for at least a portion of it to be grasped and carried in a dog's mouth and having a first end opposite a second end about a centerline;

a first flexible wing, said first flexible wing connected to said first end; and a second flexible wing, said second flexible wing connected to said second end; wherein each wing has a plurality of individual fingered flexible protuberances that are freely flexible and moveable, creating a 'flapping' motion when thrown.

15. The pet toy of claim 14, wherein said outer surface is further textured.

16. The pet toy of claim 14, wherein each said first wing and said second wing are each formed of a first half having a first color attached to a second half having a second color.

17. The pet toy of claim 14, wherein said covering provides a texture, look and feel closer to that of a natural bird prey that cannot be matched by plastic alone, thereby providing further stimulation or reinforcement of natural instincts from successive handling of the toy.

* * * * *